United States Patent
Beuten et al.

(10) Patent No.: US 7,213,267 B2
(45) Date of Patent: May 1, 2007

(54) METHOD OF PROTECTING A MICROCOMPUTER SYSTEM AGAINST MANIPULATION OF DATA STORED IN A STORAGE ASSEMBLY OF THE MICROCOMPUTER SYSTEM

(75) Inventors: Michael Beuten, Schwieberdingen (DE); Klaus Schneider, Ludwigsburg (DE); Ralf Angerbauer, Stuttgart (DE); Bernd Illg, Eppingen (DE)

(73) Assignee: Robert Bosch GmbH, Stuttgart (DE)

( * ) Notice: Subject to any disclaimer, the term of this patent is extended or adjusted under 35 U.S.C. 154(b) by 1023 days.

(21) Appl. No.: 10/145,299

(22) Filed: May 13, 2002

(65) Prior Publication Data
US 2002/0194479 A1 Dec. 19, 2002

(30) Foreign Application Priority Data
May 12, 2001 (DE) .............................. 101 23 169

(51) Int. Cl.
*H04L 9/00* (2006.01)
(52) U.S. Cl. .................. 726/26; 709/225; 713/155; 713/159; 713/193; 713/185; 713/172; 713/184; 726/2; 726/7; 726/17; 726/20; 726/30
(58) Field of Classification Search ............... None
See application file for complete search history.

(56) References Cited

U.S. PATENT DOCUMENTS 5,768,390 A 6/1998 Coppersmith et al.
5,774,544 A 6/1998 Lee et al.
5,778,071 A * 7/1998 Caputo et al. .............. 713/159
5,949,882 A * 9/1999 Angelo ....................... 713/185

FOREIGN PATENT DOCUMENTS

DE 197 23 332 3/1998

OTHER PUBLICATIONS

Secure Computing Corporation, 'Using public key-based user authentication with SafeWord® PremierAccess™', Secure Computing Corporation, 2003, entire document, http://www.securecomputing.com/pdf/spa_pki_sb.pdf.*

* cited by examiner

*Primary Examiner*—Nasser Moazzami
*Assistant Examiner*—Ronald Baum
(74) *Attorney, Agent, or Firm*—Kenyon & Kenyon LLP (57) ABSTRACT

A method of protecting a microcomputer system against manipulation of data stored in a storage assembly of the microcomputer system, particularly for protecting a program stored in the storage assembly, is described. In the method, the data is stored in marked or encrypted form in the storage assembly with the aid of an asymmetrical encryption method. In order to minimize the misuse of private keys which fall into the hands of unauthorized persons, a smart card protected by a personal identification number, on which the private key and an encryption algorithm for the asymmetrical encryption method are stored, is used for marking or encrypting the data.

20 Claims, 7 Drawing Sheets

METHOD OF PROTECTING A MICROCOMPUTER SYSTEM AGAINST MANIPULATION OF DATA STORED IN A STORAGE ASSEMBLY OF THE MICROCOMPUTER SYSTEM

FIELD OF THE INVENTION

The present invention relates to a method of protecting a microcomputer system against manipulation of data stored in a storage assembly of the microcomputer system. The data is, for example, a program, limiting values, characteristics maps, or parameters, or a serial number of the microcomputer system. The present invention also relates to a storage element for a smart card having a computing device, particularly a microprocessor, and a storage element.

BACKGROUND INFORMATION

Various methods are used to prevent unauthorized manipulation of a control program stored in a control device of a motor vehicle or data stored from this program. The control program controls or regulates specific functions in the motor vehicle, for example an internal combustion engine, a driving dynamics regulator, a stop control system (SCS), or an electronic steering system (steer-by-wire). A defect and/or a change in the mode of operation of the controlled or regulated unit of the motor vehicle may occur due to a manipulation of the control program. Therefore, manipulation of the control program or the data is to be prevented as much as possible, but the manipulation is at least to be detectable afterwards, so that the cause of a defect of a controlled or regulated unit may be established or so that warranty claims may be pursued correctly.

In spite of the danger of manipulation of the control program or the data by unauthorized persons, it is usually not advisable to prevent access to the storage assembly of the control device completely. In order to, for example, perform reprogramming of the control device, it must be possible for an authorized user group to access the storage assembly. Specifically, it may be necessary from time to time to store a new version of a control program or new parameters or limiting values in the control device in order to, for example, remove errors in the software or to take new legal requirements into account.

Control devices can be protected against manipulation of the control program by asymmetrically encrypting the data in which the control program and the data are stored in a storage assembly of the control device. The asymmetrical encryption method is also referred to as a public key encryption method and is used by BMW AG, whose main office is in Munich, Germany, and by Siemens AG, whose main offices are in Munich and Berlin, Germany, for encrypting or marking a control program stored in a control device of a motor vehicle and/or of data stored therein.

In the conventional asymmetric encryption method, a hash value is formed from the control program and/or the data to be marked with the aid of a hash function. A hash value is a type of check-sum of fixed length having special properties which are a function of the hash function used. The hash value is encrypted with the aid of a private key, which is not freely accessible. The encrypted hash value is referred to as a signature. The signature is appended to the program and/or the data to be marked and is transmitted to the motor vehicle control device together with them and stored there in the storage assembly.

In the control device, the signature is decrypted with the aid of a freely accessible public key. In this way, the decrypted hash value is obtained. In addition, with the aid of the same hash function which was also used in the course of encryption to obtain the hash value, an additional hash value is determined from the control program and/or data received. Subsequently, it is checked whether the decrypted hash value is identical to the additional hash value. If this is the case, the execution of the control program transmitted and/or the use of the data transmitted is enabled. Otherwise, the execution of the control program and/or the use of the data is blocked.

A problem of the conventional method lies in the management of the private key. This key is available to multiple persons at a control device developer or a motor vehicle developer, each user being assigned his own private key. If a private key—for whatever reason—falls into the hands of unauthorized persons, they may misuse the private key for reprogramming a whole series of control devices of the same type, without the control device manufacturer or the motor vehicle manufacturer being capable of preventing this and without the manipulation of the control program and/or the data by unauthorized persons being capable of being recognized afterward. In the conventional method, a compromised private key may not be detected as such and, if necessary, blocked.

SUMMARY

An object of the present invention is to provide a possibility for minimizing the misuse of private keys which fall into the hands of unauthorized persons.

According to an example embodiment of the present invention, a smart card protected by a personal identification number (PIN), on which a private key and an encryption algorithm for the asymmetrical encryption method are stored, may be used for marking or encrypting the data.

A card manufactured from plastic, into which a complete microcomputer having a computing device, particularly a microprocessor, and a storage element are embedded so that they terminate flush with the surface of the card, is typically referred to as a smart card. The microcomputer may come into contact with electrical components lying outside the smart card, for example a read/write unit, via contact zones located on the surface of the card. A private key and an encryption algorithm for an asymmetrical encryption method are stored on the smart card. The authorization of a user to use the smart card and to mark or encrypt a program or data is checked using the PIN.

The verification in the microcomputer system, e.g., the control device, of the data stored in the storage assembly is performed in a conventional way by decryption of the signature or the encrypted data with the aid of a public key and by comparison of the decrypted signature or the decrypted data with the original data or the original checksum. The verification of the data in the microcomputer system may be performed before every execution or every use of the data or only at specific times and may be performed for all of the data or only a part of it.

Through the use of a PIN-protected smart card according to the present invention, the misuse of a private key which falls into the hands of an unauthorized person may be greatly restricted. Specifically, to manipulate a program and/or data, the unauthorized person must be in possession of not only the smart card for the private key, but also the PIN for checking the authorization of the user. The use of the private key is therefore additionally ensured by checking the authorization of the user via the PIN.

Two advantageous embodiments of the present invention are described in detail below. In both embodiments, the check of the authorization of a user via the PIN is performed on the smart card and/or on electric components connected to the smart card and located outside the smart card, e.g., on a suitable interface. According to a first embodiment of the present invention, the actual marking or encryption of the data may also be performed on the smart card. According to a second embodiment of the present invention, the actual marking or encryption of the data is performed on an additional microcomputer system, which may be part of a trust center, located outside the smart card.

According to the first embodiment of the present invention, the authorization of a user is checked using the PIN and, if the authorization of the user has been established, the data to be marked or encrypted is marked or encrypted for storage in the storage assembly with the aid of the private key and the encryption algorithm stored on the smart card. The marked or encrypted data is then transmitted to the storage assembly of the microcomputer system, stored there, and verified to a selectable extent at a selectable time. According to this embodiment, the marking and/or the encryption of the data is thus performed on the smart card itself. An additional external microcomputer system for marking or encryption is not necessary.

According to a second embodiment of the present invention, the authorization of a user is checked using the PIN and, if the authorization of the user has been established, the data to be marked or encrypted is transmitted to an additional microcomputer system, and the data transmitted is marked or encrypted for storage in the storage assembly with the aid of an additional private key and an additional encryption algorithm stored in the additional microcomputer system. The marked or encrypted data is then transmitted to the storage assembly of the microcomputer system (e.g., control device), stored there, and verified to a selectable extent at a selectable time. According to this embodiment, the private key stored on the smart card is therefore only used to mark or encrypt the data for the data transmission to the additional microcomputer system. The actual encryption of the data for storage in the storage assembly of the microcomputer system (e.g., control device) is performed with the aid of the additional private key and the additional encryption algorithm stored in the additional microcomputer system. The additional microcomputer system is, for example, a signature server, which is part of a trust center. An ability to block compromised private keys before the marking or encryption of the data for storage in the storage assembly of the control device may be provided on the signature server. In this way, misuse of private keys which fall into the hands of unauthorized persons may be significantly reduced. The transmission of the data to the additional microcomputer system may be performed either via a local computer network or via any other network, particularly via the Internet.

According to a refinement of the present invention, the data to be marked or encrypted for storage in the storage assembly is marked or encrypted for transmission to the additional microcomputer system with the aid of the private key and the encryption algorithm stored on the smart card, the data transmitted is verified to authenticate the private key stored on the smart card, and, if the private key stored on the smart card is successfully authenticated, the data is marked or encrypted for storage in the storage assembly with the aid of the additional private key and the additional encryption algorithm.

According to a further embodiment of the present invention, to verify marked data, the signature of the data transmitted is decrypted with the aid of a public key and compared with the data transmitted, and if the decrypted data corresponds to the data transmitted, a successful authentication is established.

Furthermore, to mark data, a check-sum value is determined from the data to be marked using a check-sum function, the check-sum value is encrypted into a signature with the aid of the private key and the encryption algorithm stored on the smart card, the signature is transmitted with the data to the additional microcomputer system, where, to verify marked data, the signature is decrypted with the aid of a public key stored on the additional microcomputer system, an additional check-sum value is calculated from the data transmitted using the check-sum function, the decrypted check-sum value is compared with the additional check-sum value, and, if the decrypted check-sum value corresponds to the additional check-sum value, a successful authentication is established.

An ID of the user is advantageously transmitted together with the data to the additional microcomputer system and the public key is taken from a user database as a function of the user ID. If no corresponding public key may be taken from the user database for a specific user or if the public key stored in the user database is incorrect, i.e., the marked or encrypted data transmitted to the additional microcomputer system may not be decrypted or may not be decrypted correctly, there may be two reasons for this. Either the user ID is not known, because the person is unauthorized, or the private key used has been blocked. In both cases, it is assumed that an unauthorized attempt is being made to mark or encrypt data and appropriate defensive measures are initiated.

According to another advantageous refinement of the present invention, an ID of the user is transmitted together with the data to the additional microcomputer system and an authorization of a user to mark or encrypt various data is taken from a project database as a function of the user ID and is correspondingly taken into account during marking or encryption of the data for storage in the storage assembly.

According to another embodiment of the present invention, the data transmission to and from the additional microcomputer system is performed via the Internet. At least the data transmission to the additional microcomputer system is advantageously performed as electronic mail (e-mail), particularly in accordance with the Simple Mail Transfer Protocol (SMTP) standard.

The marking or encryption of the data is logged and the log is stored. In this way, it is possible afterwards to identify the user who had specific data marked or encrypted at a specific time. This allows further reduction of the misuse of compromised private keys.

The implementation of the method according to the present invention in the form of a storage element which is provided for a smart card or for a microcomputer system is particularly significant. A computer program is stored on the storage element which is executable on a computing device, particularly on a microprocessor, and which is suitable for carrying out the method according to the present invention. In this case, the present invention is thus implemented by a computer program stored on the storage element, so that this storage element provided with the computer program represents the present invention in the same way as the method which the computer program is suitable for performing. An electrical storage medium may particularly be used as the storage element, for example a read-only memory, a random access memory, or a flash memory.

The present invention also provides a computer program which is executable on a computing device, particularly on a microprocessor, and which is suitable for carrying out the method according to the present invention when it runs on the computing device. It is particularly advantageous in this case if the computer program is stored on a storage element, particularly on a flash memory.

According to an example embodiment of the present invention, the smart card may be protected by a personal identification number (PIN), and a private key and an encryption algorithm for marking or encrypting data using an asymmetrical encryption method may be stored on the storage element.

According to an advantageous refinement of the present invention, a computer program which is executable on the computing device and which is suitable for carrying out the method according to the present invention is stored on the storage element.

In another example embodiment of the present invention, a microcomputer system to carry out the method described above may be provided. The microcomputer system may be, for example, a signature server of a trust center. Data to be marked or encrypted is transmitted to the signature server before it is, for example, stored in a control device of a motor vehicle. A private key present in the trust center may be used for marking or encrypting the data. The private key may be assigned by a certification authority of the trust center. For security reasons, the signature server is only connected to the certification authority offline. The means for carrying out the method may be realized using hardware.

According to an advantageous refinement of the present invention, the means for carrying out the method can also be implemented as a computer program which is stored on the storage element and is executable on the computing device.

According to another embodiment of the present invention, the microcomputer system includes a safety lock element to a data connection in order to prevent unauthorized access to the microcomputer system via the data connection, every access to the microcomputer system occurring via the safety lock element. The data to be marked or encrypted is, for example, transmitted to the signature server via this safety lock element, so that unauthorized access to the signature server and manipulation of the trust center are almost eliminated.

DETAILED DESCRIPTION

An object of the present invention is to provide a method of protecting a microcomputer system, which is, for example, implemented as a control device of a motor vehicle, against manipulation of data stored in a storage assembly of the microcomputer system. The data is, for example, implemented as a control program, as limiting values, characteristic maps, or parameter values. In the method, the data are stored in marked or encrypted form in the storage assembly with the aid of an asymmetrical encryption method. Before the execution or use of the data, it is verified in the control device at specific times and to a specific extent. If the verification fails, the data is blocked.

A private key is used to mark or encrypt the data. A public key is used to check the signature of the data or to decrypt the data in the control device. The management and assignment of the key pairs, which include a private and a public key, is a large security problem. The private key must be made available to multiple authorized persons on the part of a control device manufacturer and on the part of a motor vehicle manufacturer in order to be capable of reprogramming a control device as often as desired during its development, production, and testing. In order to minimize the misuse of private keys which fall into the hands of unauthorized persons, a smart card protected by a personal identification number (PIN), on which a private key and an encryption algorithm for the asymmetrical encryption method are stored, is used for marking or encrypting the data.

Figure 1:
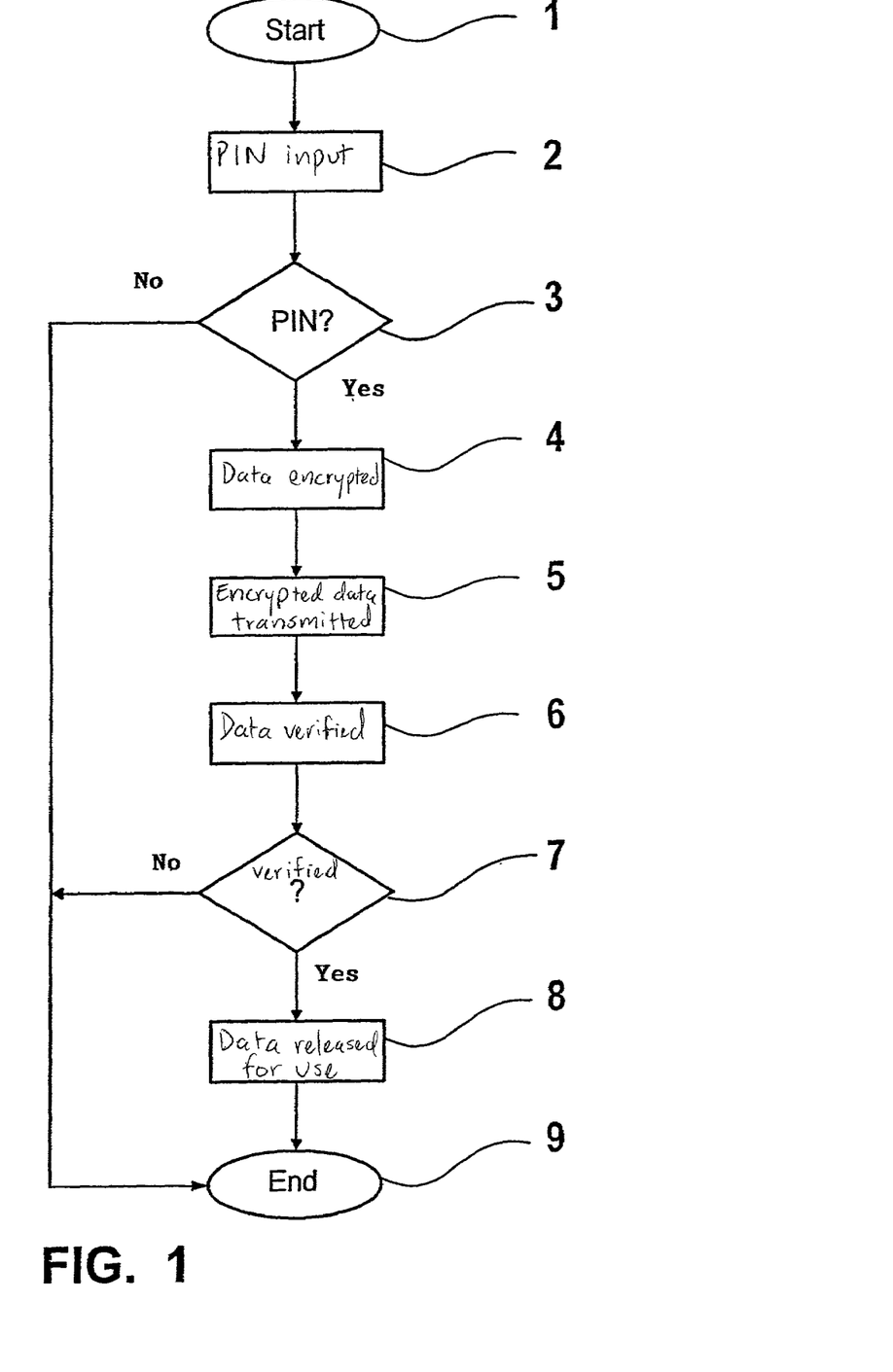
FIG. 1 shows a flow chart of a method according to a first embodiment of the present invention.

A flow chart of a method according to the present invention according to a first example embodiment is illustrated in FIG. 1. In the first embodiment, the data is marked and/or encrypted completely in the smart card before it is stored in the storage assembly of the control device. The method begins in a function block 1. In a function block 2, a PIN is input by a user, and subsequently, in a query block 3, it is checked whether the PIN input is the PIN assigned to the smart card. If the PIN is incorrect, function block 9 is branched to and the method is terminated. After multiple incorrect inputs of the PIN, the smart card is completely blocked.

Otherwise, the method is continued in a function block 4, where the data is marked or encrypted with the aid of the personal key stored in the smart card. In a function block 5, the marked or encrypted data is then transmitted to the motor vehicle control device and stored there in a storage assembly.

The data stored in the storage assembly is then verified in a function block 6. The verification of the data is described in more detail below. The verification of the data may be performed at specific times and to any desired extent. It is possible to perform the verification only upon the very first use of the data, always before every use of the data, or at selectable intervals before the use of the data. In addition, the data may be verified during use or after use. In the course of the verification, it is possible to verify all or only a part of the data stored in the storage assembly. If only a part of the data is verified, the same part of the data may always be verified or different parts of the data may be verified.

In a query block 7, it is then checked whether the verification of the data stored in the storage assembly was successful. If not, function block 9 is branched to and the method is terminated. The data is therefore blocked and may not be used. If the verification was successful, the data is released for use in a function block 8. In this case, the control program may be executed completely normally and the limiting values or parameter values may be used completely normally.

Figure 2:
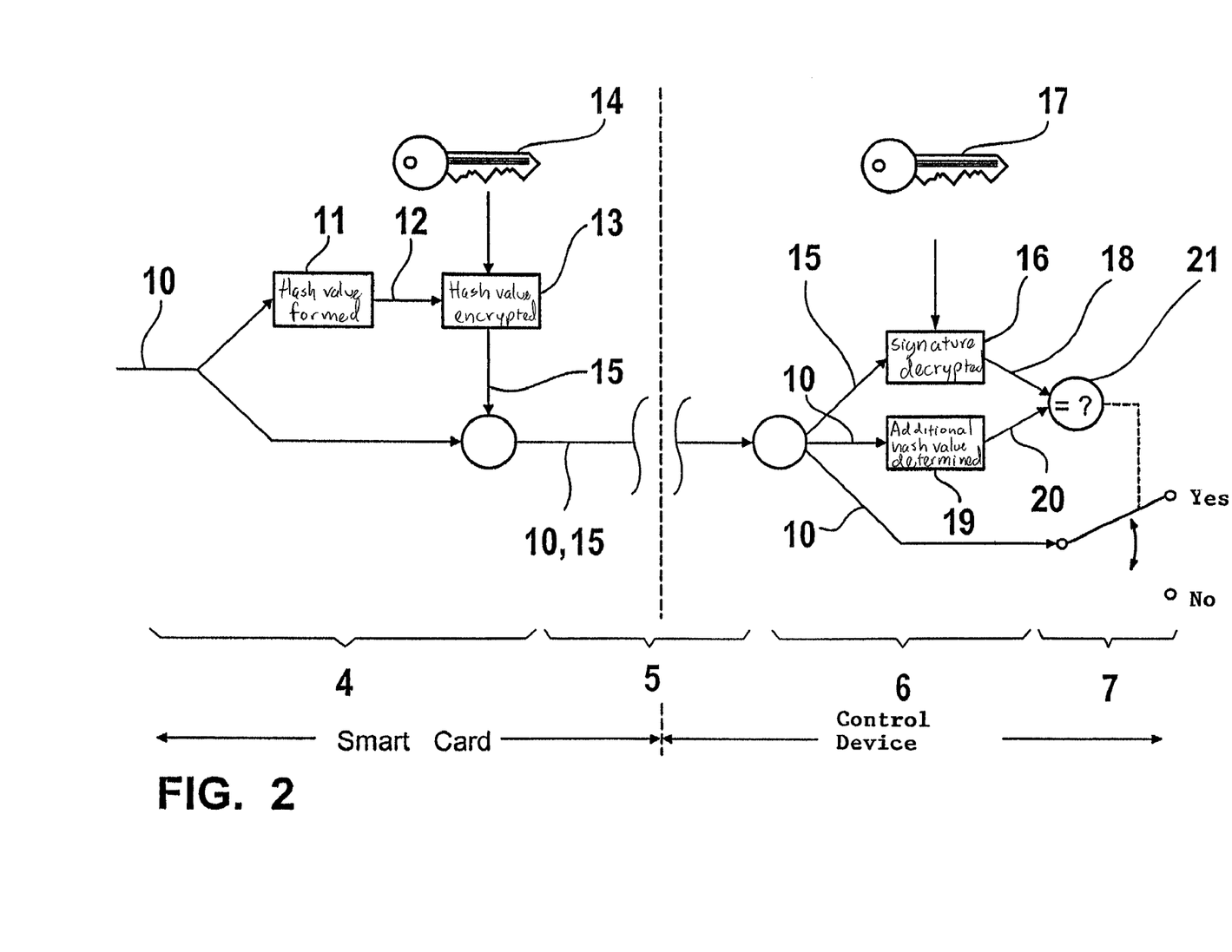
FIG. 2 shows a further flow chart of the method shown in FIG. 1.

FIG. 2 shows a part of the method illustrated in FIG. 1. After a successful PIN query, data 10 to be marked is transmitted to the smart card. In a function block 11, a hash value 12 is formed from data 10 with the aid of a hash function. Alternatively, hash value 12 may also be transmitted directly to the smart card. Hash value 12 is encrypted in a function block 13 with the aid of private key 14 stored in the smart card. The encrypted hash value is referred to as a signature 15. Signature 15 is appended to data 10, and both are transmitted to the control system of a motor vehicle via a suitable data interface and stored there in the storage assembly.

In the control device, data 10 is separated from signature 15. Signature 15 is decrypted in a function block 16 with the aid of a public key 17. The decrypted hash value is indicated using reference number 18. In a function block 19, an additional hash value 20 is determined from data 10 using the same hash function as was also used in function block 11. In a query block 21 it is checked whether decrypted hash value 18 is identical to additional hash value 20. If this is the case, data 10 is released for use. Otherwise, data 10 is blocked and may not be used.

Figure 3:
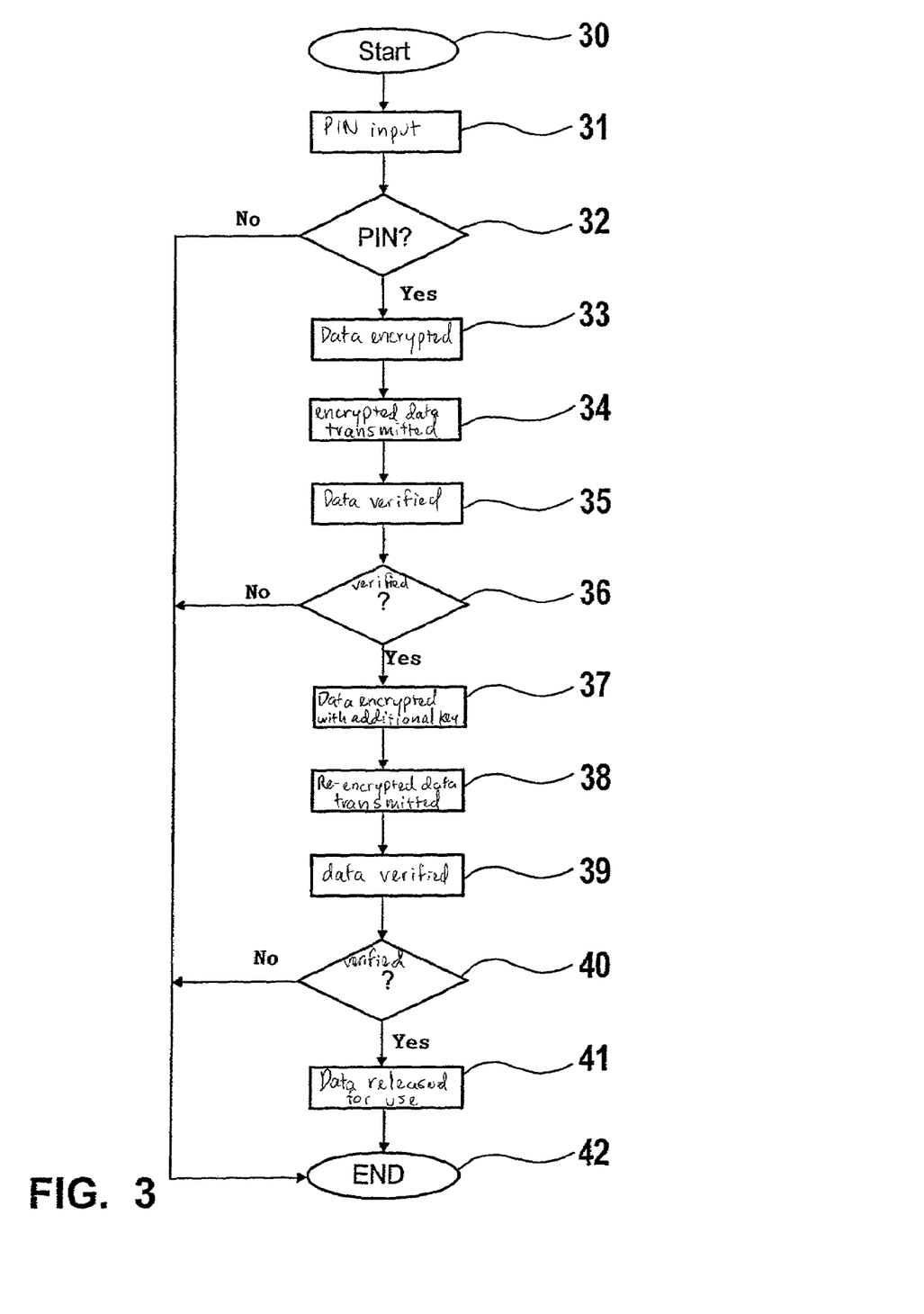
FIG. 3 shows a flow chart of a method according to a second embodiment of the present invention.

A flow chart of a second example embodiment of the method according to the present invention is illustrated in FIG. 3. The method differs from the method illustrated in FIGS. 1 and 2 in that the marking or encryption of the data before storage in the storage assembly of the control device is performed not on the smart card, but rather in an additional external microcomputer system, which is, for example, implemented as a signature server of a trust center. The private key and the encryption algorithm stored on the smart card are merely used for marking or encrypting the data for the purpose of secure data transmission from the smart card to the signature server.

The method from FIG. 3 begins in a function block 30. A PIN is input by a user in a function block 31 and it is subsequently checked in a query block 32 whether the PIN input is the PIN assigned to the smart card. If the PIN is incorrect, a function block 42 is branched to and the method is terminated. After multiple incorrect inputs of the PIN, the smart card is completely blocked.

Otherwise, the method is continued in a function block 33, in which the data is marked or encrypted with the aid of the personal key stored in the smart card. The marked or encrypted data is then transmitted to the signature server in a function block 34. In a function block 35, the data transmitted to the signature server is verified in order to check whether the personal key used is OK or compromised. The verification of the data transmitted is described in more detail below.

It is then checked in a query block 36 whether the verification of the data transmitted to the signature server was successful. If not, function block 42 is branched to and the method is terminated. The data is therefore not marked or encrypted and stored in the storage assembly of the control device at all. If the verification was successful, the data is marked or encrypted in a function block 37 using an additional private key stored in the signature server. In a function block 38, the marked or encrypted data is then transmitted to the motor vehicle control device and stored there in the storage assembly.

In a function block 39, the data stored in the storage assembly is verified. The verification of the data is also described in more detail below. The verification of the data may be performed at specific times and to any desired extent. In a query block 40, it is then checked whether the verification of the data stored in the storage assembly was successful. If not, function block 42 is branched to and the method is terminated. The data is therefore blocked and may not be used. If the verification was successful, the data is released for use in a function block 41. In this case, the control program may be executed completely normally and the limiting values or parameter values may be used completely normally.

Figure 4A:
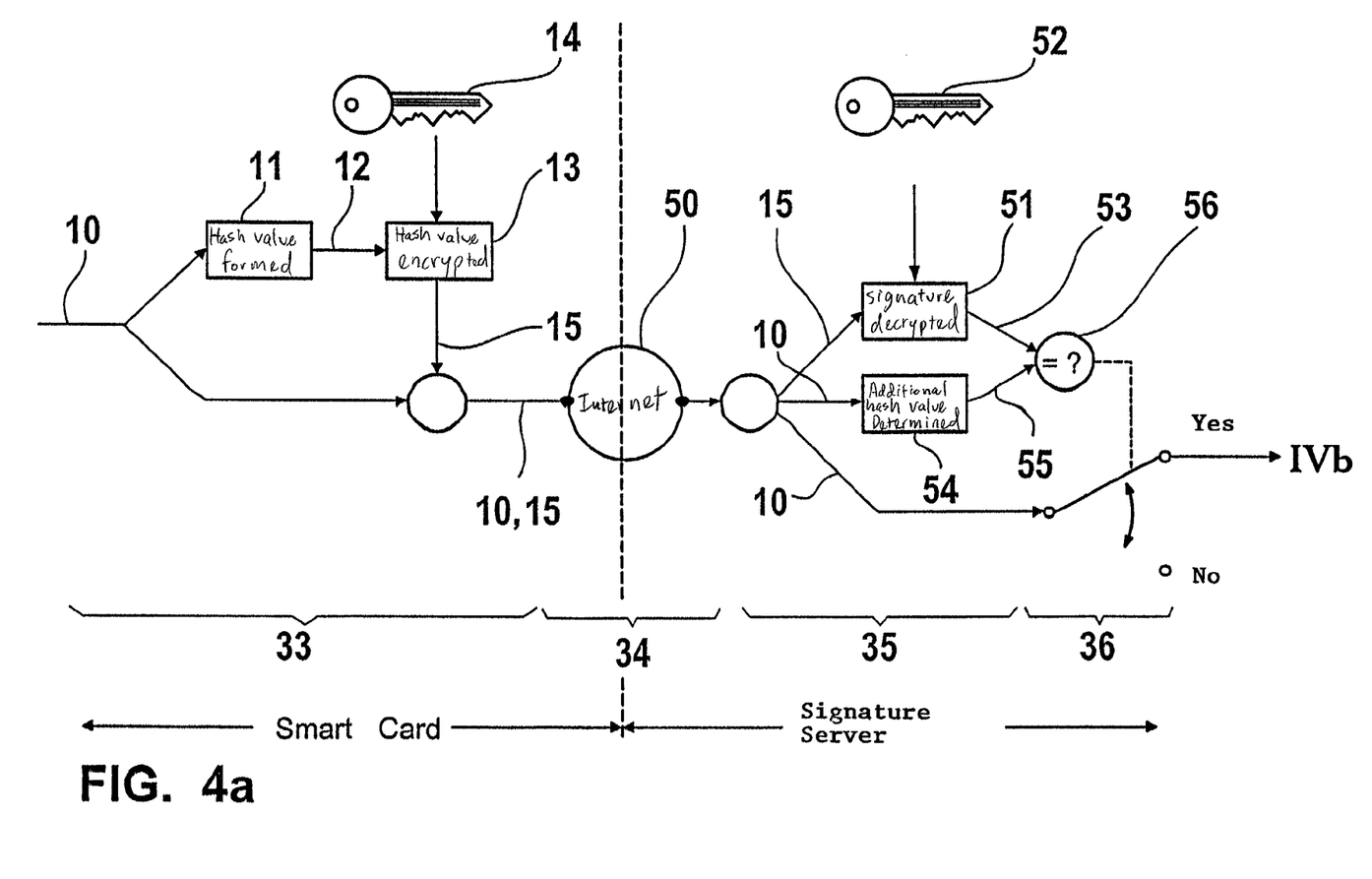
FIG. 4a shows a flow chart of the first part (data transmission) of the method shown in FIG. 3.

FIG. 4a shows a first part of the method illustrated in FIG. 3. After a successful PIN query, data 10 to be marked is transmitted to the smart card. In a function block 11, a hash value 12 is formed from data 10 with the aid of a hash function. Alternatively, hash value 12 may also be transmitted directly to the smart card. Hash value 12 is encrypted in a function block 13 with the aid of private key 14 stored on the smart card. The encrypted hash value is referred to as a signature 15. Signature 15 is appended to data 10 and both are transmitted via Internet 50 to the signature server of a trust center. In addition, an ID of a user of the smart card is transmitted to the signature server.

In the signature server, data 10 is separated from signature 15. Signature 15 is decrypted in a function block 51 with the aid of a public key 52 stored in the signature server. The decrypted hash value is indicated using reference number 53. Public key 52 is selected from a user database with reference to the user ID. In a function block 54, an additional hash value 55 is determined from data 10 using the same hash function as was also used in function block 11. In a query block 56 it is checked whether decrypted hash value 53 is identical to additional hash value 55. This is not the case if no public key 52 or an incorrect public key 52 is stored in the user database for a transmitted user ID. In this case, the method is terminated and data 10 is neither marked nor encrypted nor stored in the storage assembly of the control device. If, however, decrypted hash value 53 is identical to established hash value 55, it is assumed that private key 14 is correct. The method is continued in FIG. 4b.

Figure 4B:
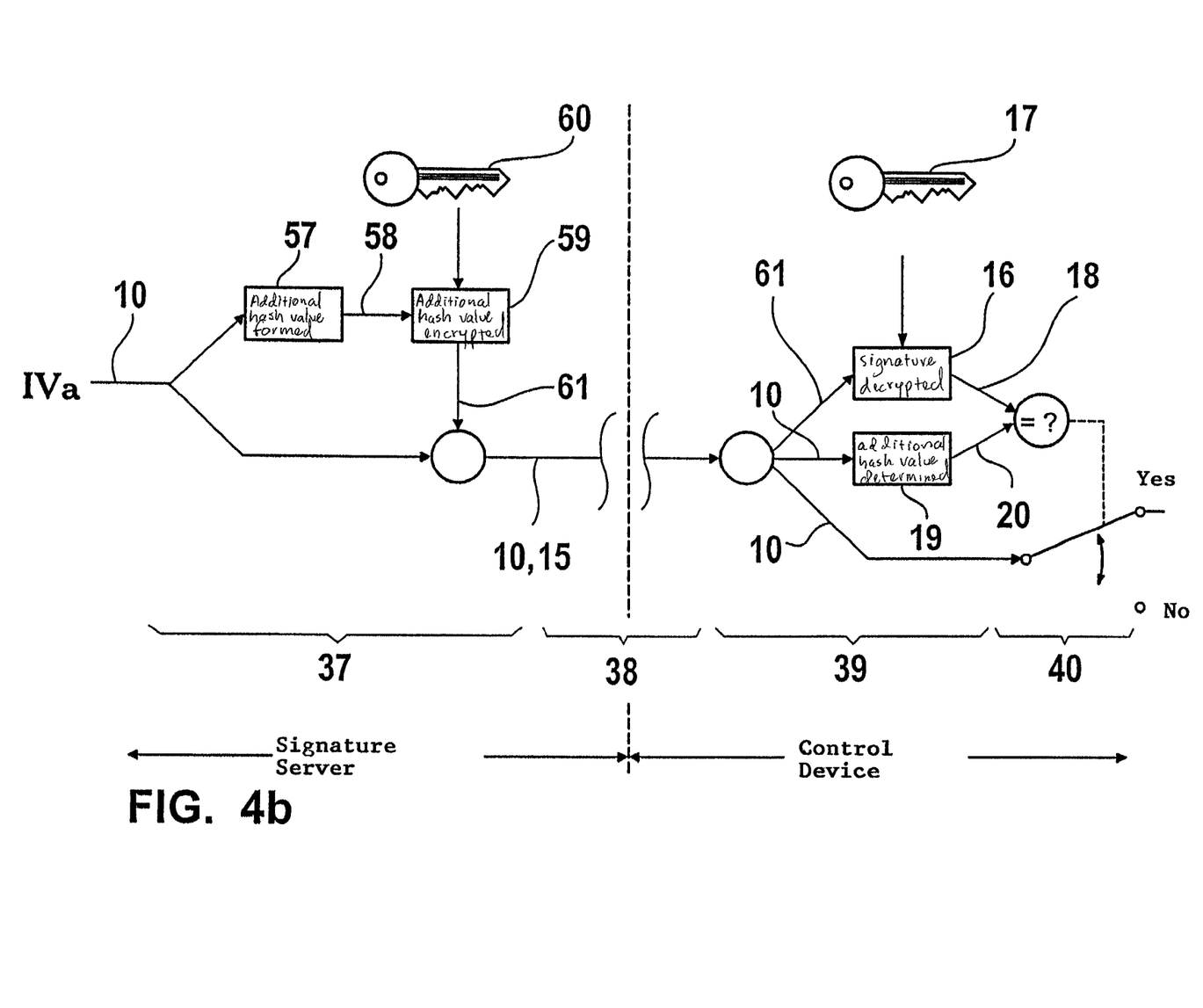
FIG. 4b shows a flow chart of a second part (marking) of the method shown in FIG. 3.

The actual marking of the data in the signature server, before the data is stored in the storage assembly of the control device, is illustrated in FIG. 4b. In a function block 57, an additional hash value 58 is formed from data 10 with the aid of an additional hash function. Additional hash value 58 is encrypted in a function block 59 with the aid of a private key 60 present in the signature server. The encrypted hash value is referred to as a signature 61. Signature 61 is appended to data 10, and both are transmitted via a suitable data interface to the control system of a motor vehicle and stored there in the storage assembly.

In the control device, data 10 is separated from signature 61. Signature 61 is decrypted in a function block 16 with the aid of a public key 17. The decrypted hash value is indicated using reference number 18. In a function block 19, an additional hash value 20 is determined from data 10 using the same hash function as was also used in function block 57. In a query block 21 it is checked whether decrypted hash value 18 is identical to additional hash value 20. If this is the case, data 10 is released for use. Otherwise, data 10 is blocked and may not be used.

As an alternative to the method illustrated in FIGS. 4a and 4b, hash value 12 may also simply be included in a request e-mail and the e-mail marked with the aid of private key 14 stored on the smart card. The e-mail is transmitted via Internet 50 to the signature server, where the signature of the e-mail is checked. Encrypted hash value 61 may then be appended to data 10 again in the control device.

Figure 5:
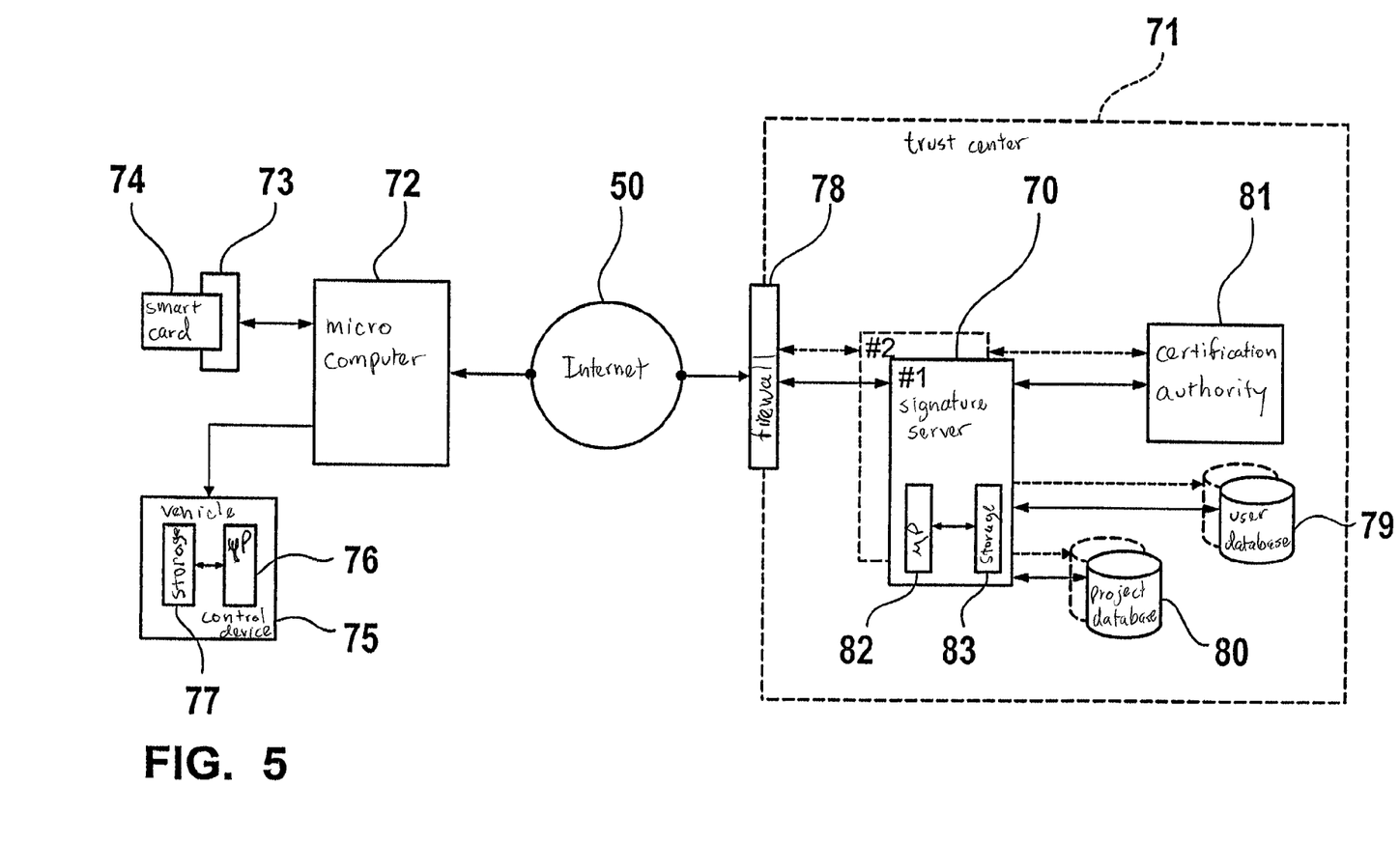
FIG. 5 shows a trust center having a microcomputer system according to an embodiment of the present invention.

In FIG. 5, a trust center having a signature server 70 according to an embodiment of the present invention is referred to as a whole using reference number 71. Signature server 70 is connected via Internet 50 to a microcomputer 72, to which a smart card 74 is connected via a suitable interface 73. Smart card 74 is described in more detail in the following with reference to FIG. 6. Microcomputer 72 is, for example, implemented as a personal computer (PC). Data 10, for example, a new control program for a motor vehicle control device 75, which are to be stored marked or encrypted in a storage assembly 76 of control device 75, is stored on microcomputer 72. A computing device, particularly a microprocessor, of control device 75 is indicated using reference number 77.

First, the authorization of a user is checked via inputting and checking a PIN as marked to smart card 74. If the user is authorized, new control program 10 is marked or encrypted for data transmission to signature server 70 with the aid of a private key 14 and an encryption algorithm stored on smart card 74. The marked or encrypted control program is transmitted, together with a user ID, to signature server 70 via Internet 50. A firewall 78, through which unauthorized access to signature server 70 from Internet 50 is to be prevented, is positioned between Internet 50 and signature server 70 for security reasons. The data transmission is performed, for example, in the form of electronic mail, particularly in the form of an e-mail in accordance with the Simple Mail Transfer Protocol (SMTP) standard.

The control program received is verified on signature server 70 using a public key 52. Public key 52 is taken from a user database 79 as a function of the user ID. If a user has lost his smart card 74, public key 52 assigned to this user in user database 79, which matches private key 14 stored on lost smart card 74, may be erased immediately. If a new public key 52, which matches a new private key 14 stored on a new smart card 74, is subsequently stored for this user in user database 79, this new public key 52 is used for verification and leads to an error message for data which is still marked and/or encrypted using old private key 14. Therefore, as soon as the loss of a smart card 74, and therefore also the loss of a private key 14, is noted in user database 79, data which was marked or encrypted using this private key 14 is no longer accepted by signature server 70.

The authorizations of individual users are stored in a project database 80. Using project database 80, it is checked as a function of the user ID transmitted whether a user is authorized for the marking or encryption of the control program requested. User database 79 and project database 80 may also be combined into a joint database.

If the control program transmitted to signature server 70 was successfully verified and the user is authorized to mark or verify the control program, the control program transmitted is marked or encrypted using a private key 60 present in signature server 70. Private key 60 is generated inside trust center 71 by a certification authority 81 and may be transmitted to signature server 70 offline. The marked and/or encrypted control program is then transmitted again via Internet 50 and also possibly via firewall 78 to microcomputer 72. From there, the marked or encrypted control program is then transmitted to control device 75 and stored in storage assembly 76.

Signature server 70 includes a complete microcomputer having a computing device implemented as a microprocessor 82 and a storage element 83. Private key 60 and an encryption algorithm for an asymmetrical encryption method exist in read and write protected form on storage element 83 of signature server 70. A computer program, which is executable on microprocessor 82 and is suitable for carrying out the parts of the method according to the present invention indicated in FIGS. 4a and 4b with "signature server", is also stored on storage element 83.

There may also be multiple signature servers 70 in trust center 71, which are assigned, for example, to various companies. There may also be multiple user databases 79 and/or project databases 80 in trust center 71.

Figure 6:
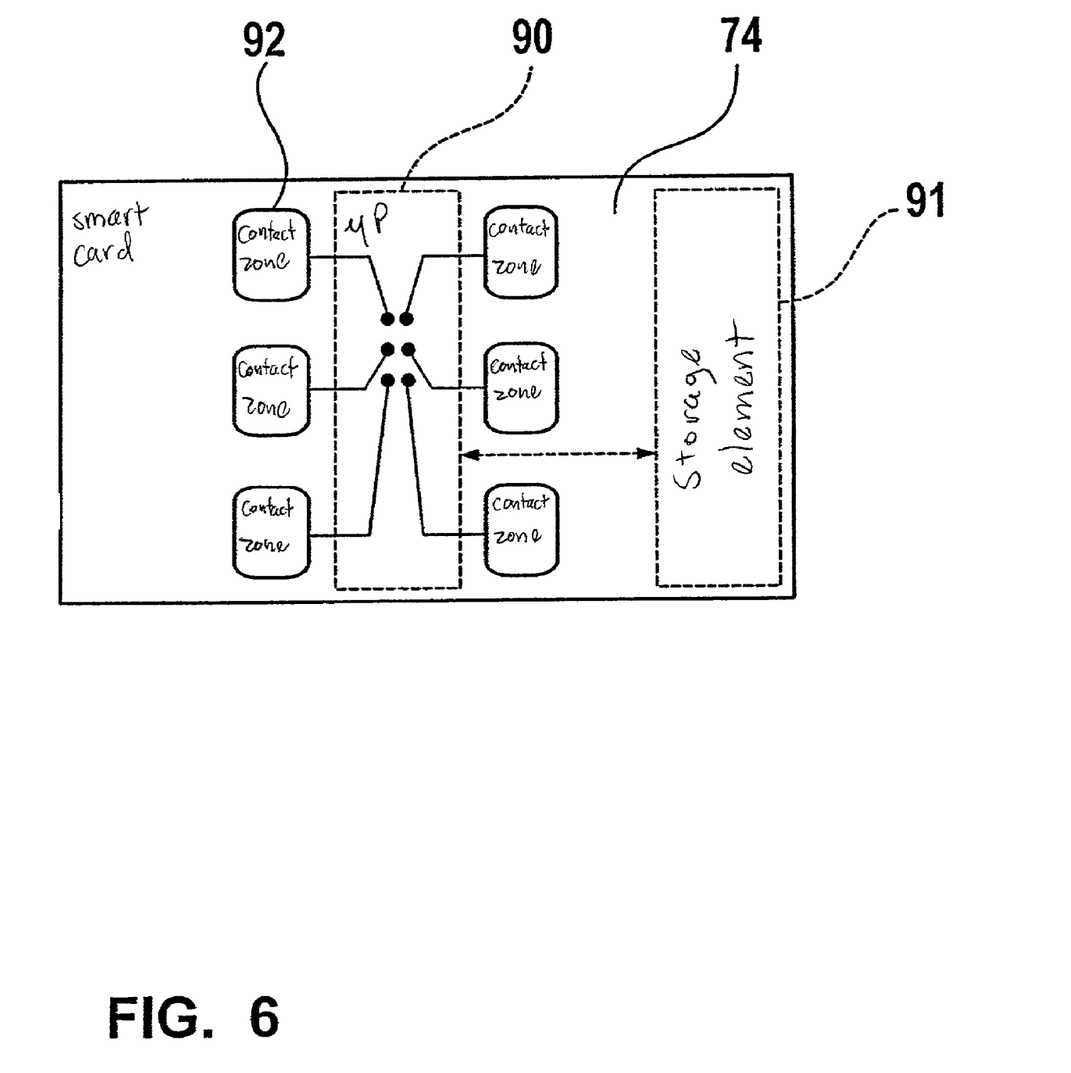
FIG. 6 shows a smart card according to an embodiment the present invention.

In FIG. 6, smart card 74 is shown in detail. Smart card 74 is manufactured from plastic and includes a complete microcomputer having a computing device implemented as a microprocessor 90 and a storage element 91. The entire microcomputer is embedded so it terminates flush with the surface of smart card 74. Microprocessor 90 may come into contact with electric components lying outside smart card 74, for example, a read/write unit (not shown), via contact zones 92 positioned on the surface of smart card 74.

Private key 14 and an encryption algorithm for an asymmetrical encryption method are stored in read and write protected form on storage element 91 of smart card 74. In addition, a computer program, which is executable on microprocessor 90 and is suitable for carrying out the parts of the method according to the present invention indicated in FIGS. 2, 4a, and 4b with "smart card", is stored on storage element 91.

What is claimed is:

1. A method of protecting a microcomputer system against reading and/or manipulation of data stored in the storage assembly of the microcomputer system, comprising:
   providing a smart card
      protected by a personal identification number (PIN);
   storing
      a private key and
      an encryption algorithm for an asymmetrical encryption method on the smart card;
   encrypting or marking the data using
      the asymmetrical encryption method stored on the smart card;
   transmitting the encrypted or marked data over a public network to
      an additional microcomputer system,
      wherein the additional microcomputer system is a signature server in a trust center;
   authenticating a user's authorization to encrypt or mark the data,
      wherein the authentication is performed by the additional microcomputer system using a user database;
   if the authorization of the user is established,
      encrypting or marking the transmitted data for storage in the storage assembly using
         an additional private key and
         an additional encryption algorithm,
            the additional private key and
            the additional encryption algorithm being stored in the additional microcomputer system.

2. The method of claim 1, wherein the data includes a program stored in the storage assembly.

3. The method of claim 1, wherein:
   encrypting or marking the data for transmission to the additional microcomputer system is performed using
      the private key and
      the encryption algorithm stored on the smart card;
   authenticating a user's authorization includes verifying the transmitted data to authenticate the private key stored on the smart card; and if the private key stored on the smart card is authenticated,
encrypting or marking the data for storage in the
storage assembly using
the additional private key and
the additional encryption algorithm.

4. The method of claim 3, wherein the verifying step includes:
decrypting a signature of the transmitted data using a public key; and
comparing the decrypted signature to the transmitted data, verification occurring if the decrypted signature corresponds to the transmitted data.

5. The method of claim 4, further comprising:
determining a check-sum value from the data using a check-sum function;
encrypting or marking the check-sum value into the signature using the private key and the encryption algorithm stored on the smart card;
transmitting the signature with the data to the additional microcomputer system;
to verify the transmitted data, decrypting the signature at the additional computer system using the public key;
determining an additional check-sum value from the transmitted data using the check-sum function; and
comparing the decrypted signature to the additional check-sum value;
wherein authentication is established if the decrypted signature corresponds to the additional check-sum value.

6. The method of claim 4, further comprising:
transmitting a user ID with the data to the additional microcomputer system; and
obtaining the public key from a user database as a function of the user ID.

7. The method of claim 1, further comprising:
transmitting
a user ID with the data
to the additional microcomputer system;
obtaining authorization for the user
to encrypt or mark the data from
a project database
as a function of the user ID; and
obtaining authorization
to encrypt the data for
storage in the storage assembly
as a function of the user ID.

8. The method of claim 1,
wherein the data is transmitted
to and from the additional microcomputer system via the Internet.

9. The method of claim 8, wherein the data is transmitted to the additional microcomputer system as electronic mail.

10. The method of claim 9, wherein the electronic mail is formed in accordance with the Simple Mail Transfer Protocol (SMTP) standard.

11. The method of claim 1, further comprising:
recording an encryption of the data in a log; and storing the log.

12. A storage element storing computer-executable instructions for causing a computer system to:
protect a smart card via a personal identification number;
store
a private key and
an asymmetrical encryption method on the smart card; and
encrypt or mark data using the asymmetrical encryption method;
transmit the encrypted or marked data over a public network to
an additional microcomputer system,
wherein the additional microcomputer system is a signature server in a trust center;
authenticate a user's authorization to encrypt or mark the data,
wherein the authentication is performed by the additional microcomputer system using a user database;
if the authorization of the user is established,
encrypt or mark the transmitted data for storage in the storage assembly using
an additional private key and
an additional encryption algorithm,
the additional private key and
the additional encryption algorithm being stored in the additional microcomputer system.

13. The storage element of claim 12, wherein the storage element includes at least one of a read-only memory, a random access memory and a flash memory.

14. A smart card comprising:
a computing device; and
a storage element coupled to the computing device, the storage element storing a private key and an asymmetrical encryption algorithm for marking or encrypting data;
wherein the smart card is protected by a personal identification number (PIN);
wherein the smart card is configured to be used in conjunction with a host microcomputer, wherein the host microcomputer transmits encrypted or marked data over a public network to an additional microcomputer system, wherein the additional microcomputer system is a signature server in a trust center; and
wherein a user's authorization to encrypt or mark the data is authenticated, wherein the authentication is performed by the additional microcomputer system using a user database.

15. The smart card of claim 14, wherein the computing device is a microprocessor.

16. The smart card of claim 15, wherein the computing device is configured to execute a computer program for causing the computing device to:
encrypt or mark data using the asymmetric encryption algorithm.

17. A microcomputer system comprising:
a storage element; and
a computing device coupled to the storage element, the computing device being configured to:
store a first private key and a first encryption algorithm in the storage element;
receive encrypted or marked data from an additional microcomputer system, wherein the additional microcomputer system utilizes a smart card that stores a second private key and a second encryption algorithm for an asymmetrical encryption of data stored in the additional microcomputer system, wherein the additional microcomputer system transmits encrypted or marked data over a public network;
authenticate a user's authorization to encrypt or mark data stored in the additional microcomputer system, wherein the authentication is performed by the microcomputer system using a user database; and if the authorization of the user is established, encrypt or mark data for storage in the additional microcomputer system using the first private key and the first encryption algorithm.

18. The microcomputer system of claim 17, wherein the computing device is a microprocessor.

19. The microcomputer system of claim 17, wherein the storage element stores a computer program for configuring the computing device.

20. The microcomputer system of claim 17, further comprising:
a safety lock element coupled to a data connection for preventing unauthorized access to the microcomputer system via the data connection, all access to the microcomputer system occurring via the safety lock element.

* * * * *